H. F. LOTZ.
CORN PLANTER.
APPLICATION FILED JAN. 13, 1910.
956,713.
Patented May 3, 1910.
2 SHEETS—SHEET 1.
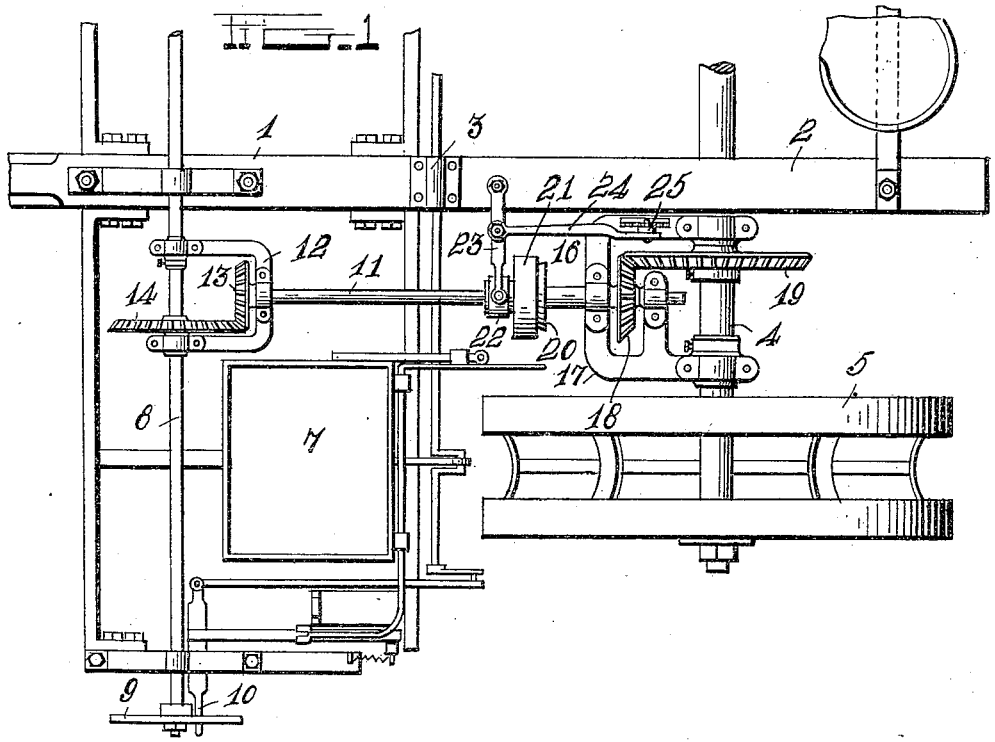
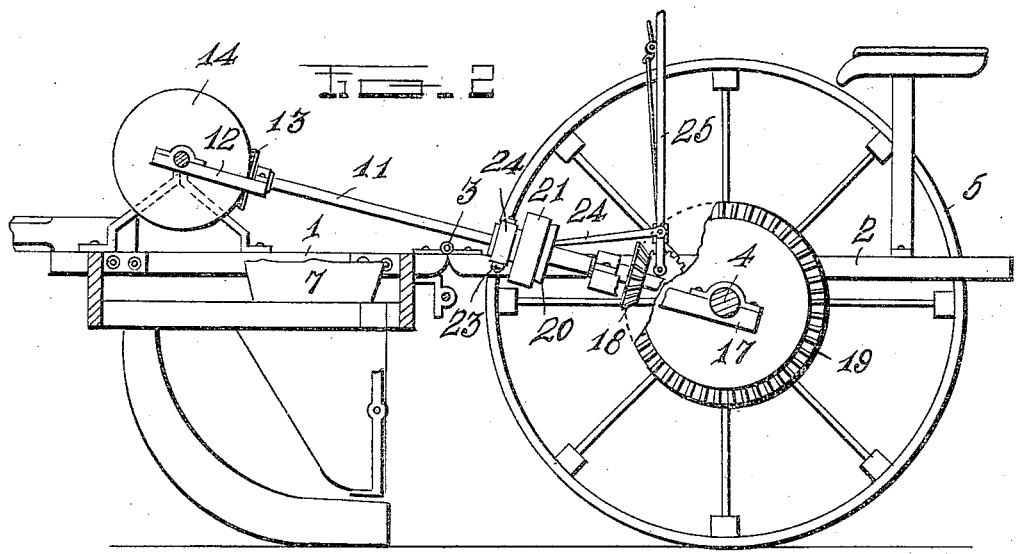
Witnesses
C. R. Hardy
C. H. Griesbauer
Inventor
H. F. Lotz
by H. B. Willson & Co
Attorneys

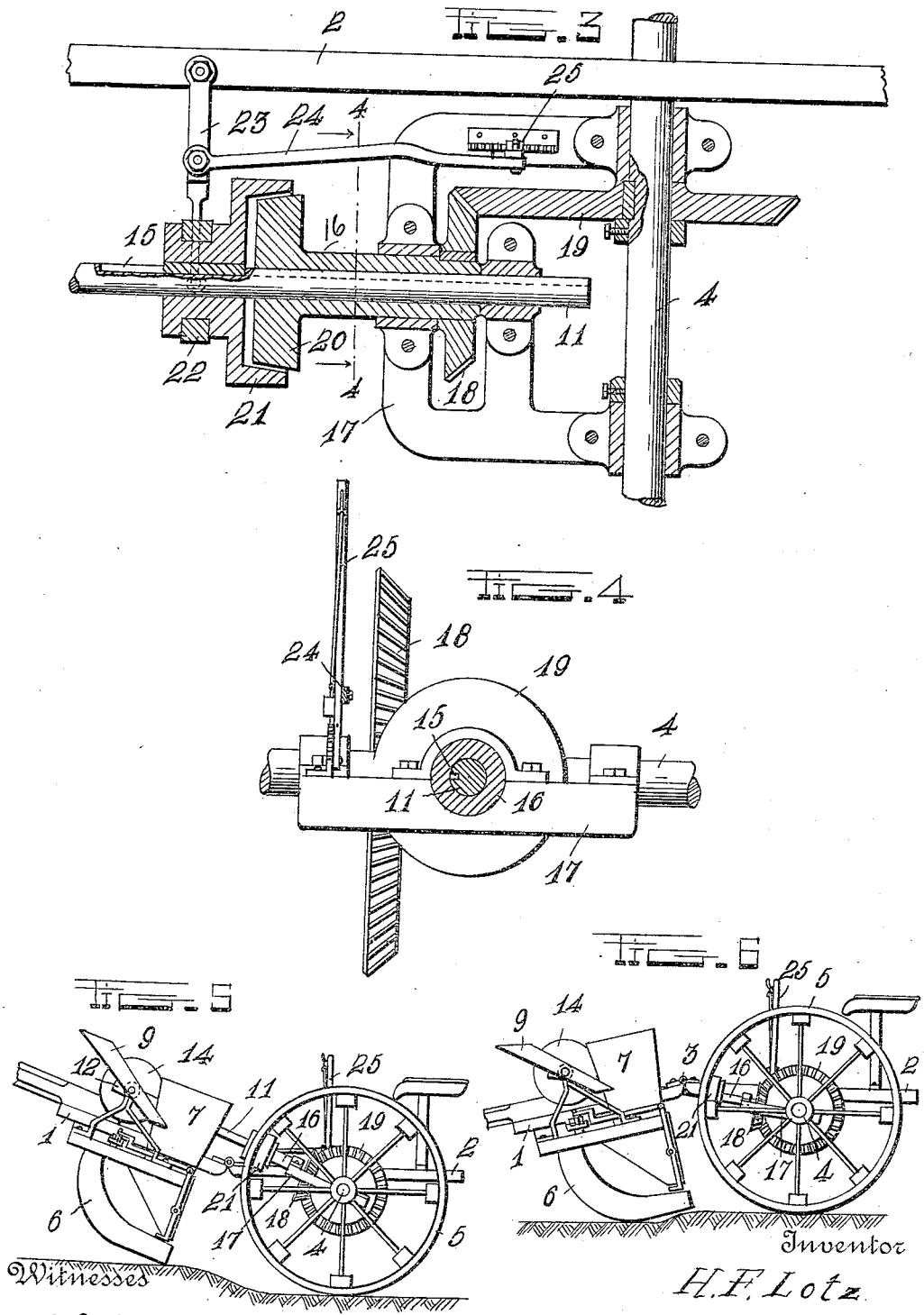

UNITED STATES PATENT OFFICE.

HERMEN F. LOTZ, OF IRONTON, MISSOURI.

CORN-PLANTER.

956,713.  Specification of Letters Patent.  Patented May 3, 1910.

Application filed January 13, 1910. Serial No. 537,882.

*To all whom it may concern:*

Be it known that I, HERMEN F. LOTZ, citizen of the United States, residing at Ironton, in the county of Iron and State of Missouri, have invented certain new and useful Improvements in Corn-Planters; and I do declare the following to be a full, clear, and exact description of the invention, such as will enable others skilled in the art to which it appertains to make and use the same.

This invention relates to improvements in corn planters.

The object of the invention is to improve the construction of the power transmitting mechanism shown in United States Patent No. 927,518, granted to Fred Fisher and assigned to me July 13th, 1909, whereby the operation of the valve actuating mechanism will not be affected by the passage of the machine over uneven ground.

With the foregoing and other objects in view, the invention consists of certain novel features of construction, combination and arrangement of parts as will be more fully described and particularly pointed out in the appended claim.

In the accompanying drawings, Figure 1 is a plan view of a portion of a corn planter embodying my improvements; Fig. 2 is a vertical longitudinal section of the same; Fig. 3 is an enlarged horizontal sectional view of the clutch mechanism and gear at the inner end of the power transmitting shaft; Fig. 4 is a vertical cross sectional view of the same on the line 4—4 of Fig. 3; Figs. 5 and 6 are outline side views showing the position of the parts when the machine is passing over uneven ground.

Referring more particularly to the drawings, 1 denotes the front portion and 2 denotes the rear portion of the planter frame, said parts being hingedly connected together as shown at 3. In the rear portion 2 of the frame is arranged the driving and supporting axle 4 which is provided with the usual supporting and driving wheels 5. The front portion 1 of the frame is supported upon the usual furrow opening runners 6 and has arranged thereon the usual grain hoppers 7 and valve operating mechanism.

The valve operating mechanism comprises a revolubly mounted shaft 8 having on its outer ends oppositely projecting trip arms 9, which are adapted to be successively brought into engagement with a trip finger 10 to operate the valves in the grain hoppers, as clearly described in the patent herein referred to. Motion is imparted to the shaft 8 from the axle 4 through a suitable power transmitting mechanism comprising a power transmitting shaft 11, the forward end of which is revolubly mounted in suitable bearings formed in a supporting yoke 12 arranged on the shaft 8, as shown. On the forward end of the shaft 11 is fixedly mounted a beveled gear pinion 13 which is operatively engaged with a beveled gear 14 fixedly mounted on the shaft 8.

The rear end of the shaft is provided with an elongated key seat 15, and said end of the shaft is loosely engaged with a sleeve 16 which is revolubly mounted in suitable bearings in a supporting yoke 17 secured to the axle 4 of the machine as shown. On the sleeve 16 is fixedly mounted a beveled gear pinion 18 which is in operative engagement with a beveled gear 19 fixedly mounted on the axle 4 of the machine. On the forward end of the sleeve 16 is formed the cone-shaped member 20 of a frictional clutch, the opposing or cup-shaped member 21 of which is slidably keyed on and turns with the shaft 11 whereby when said cup-shaped clutch member is thrown into frictional engagement with the cone-shaped member, said cup-shaped member of the clutch and the shaft is driven by the member 20 of the clutch and the sleeve 16 which latter parts are continuously rotated on the shaft 11 by the gear 19 on the axle 4.

The cup-shaped member of the clutch has arranged thereon a loose collar 22 to which is connected an operating arm 23, said arm being pivotally connected at a suitable point on the frame of the planter. The arm 23 is connected by a link 24 with an operating lever 25 arranged on the frame and having a pawl adapted to be engaged with a segmental rack, whereby the lever is held in position to engage and disengage the clutch member 21 with the member 20, thus throwing the power transmitting shaft into and out of operation.

By loosely mounting the rear end of the shaft 11 in the sleeve 16 and slidably keying the clutch 21 with the shaft, said end of the shaft will be permitted to freely move longitudinally through the sleeve and clutch member without interfering with the operation of the power transmitting gears at the opposite ends of the shaft when the machine passes over humps or hollows or uneven surfaces of the ground, this sliding movement of the shaft being clearly illustrated in Figs. 5 and 6 of the drawings wherein it will be seen that in passing over humps or hollows in the ground the gears on the front and rear portions of the frame are brought nearer together or farther apart, thus preventing the use of a sprocket gear or fixed shaft connection between these parts.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

Having thus described my invention, what I claim is:—

In a corn planter, a driving and supporting axle, a power transmitting gear fixedly mounted on said axle, a shaft supporting yoke arranged on said axle, a sleeve revolubly mounted in said yoke, a gear arranged on one end of said sleeve and adapted to engage the gear on said axle whereby the sleeve is continuously driven, a clutch member on the opposite end of said sleeve, a valve operating shaft, a gear fixedly mounted on said shaft, a yoke arranged on the shaft, a power transmitting shaft having its forward end revolubly mounted in said yoke, a gear on said end of the shaft and adapted to engage the gear on said valve operating shaft, a clutch member slidably keyed to said power transmitting shaft whereby the latter is free to move longitudinally through said clutch member and through said revolubly mounted sleeve, and a lever operatively connected with the clutch member on said shaft whereby the latter is thrown into and out of engagement with the clutch member on said sleeve, thereby operatively connecting the sleeve with said power transmitting shaft to drive the latter.

In testimony whereof I have hereunto set my hand in presence of two subscribing witnesses.

HERMEN F. LOTZ.

Witnesses:
C. R. CROW,
J. C. ENDERS.